(12) United States Patent
VanMetter et al.

(10) Patent No.: US 8,184,877 B2
(45) Date of Patent: May 22, 2012

(54) RENORMALIZATION OF DUAL-ENERGY IMAGES

(75) Inventors: Richard Lawrence VanMetter, Washington, DC (US); John Yorkston, Penfield, NY (US); Jeffery H. Siewersden, Toronto (CA)

(73) Assignee: Carestream Health, Inc., Rochester, NY (US)

( * ) Notice: Subject to any disclaimer, the term of this patent is extended or adjusted under 35 U.S.C. 154(b) by 1030 days.

(21) Appl. No.: 12/028,935

(22) Filed: Feb. 11, 2008

(65) Prior Publication Data

US 2008/0192898 A1 Aug. 14, 2008

Related U.S. Application Data

(60) Provisional application No. 60/889,356, filed on Feb. 12, 2007.

(51) Int. Cl.
*G06K 9/00* (2006.01)
*H05G 1/64* (2006.01)

(52) U.S. Cl. ........................................ 382/128; 378/98.9

(58) Field of Classification Search .................. 382/128, 382/129, 130, 131, 132, 133, 134; 378/4, 378/9, 37, 98.8, 98.11, 98.12, 5, 28, 98.9; 128/920, 922; 600/407, 410, 411, 425; 250/390.02
See application file for complete search history.

(56) References Cited

U.S. PATENT DOCUMENTS

| | | | |
|---|---|---|---|
| 4,029,963 A * | 6/1977 | Alvarez et al. ...................... 378/5 |
| 4,541,106 A | 9/1985 | Belanger et al. |
| 4,792,900 A | 12/1988 | Sones et al. |
| 5,020,085 A | 5/1991 | Kawara et al. |
| 5,046,118 A | 9/1991 | Ajewole et al. |
| 5,115,394 A | 5/1992 | Walters |
| 5,541,028 A | 7/1996 | Lee et al. |
| 5,606,587 A * | 2/1997 | Barski et al. .................... 378/62 |
| 5,633,511 A * | 5/1997 | Lee et al. ...................... 250/587 |
| 5,931,780 A * | 8/1999 | Giger et al. .................... 600/407 |
| 6,343,111 B1 | 1/2002 | Avinash et al. |
| 6,636,582 B2 | 10/2003 | Rader et al. |
| 6,683,934 B1 | 1/2004 | Zhao et al. |
| 6,815,572 B1 | 11/2004 | Brunelot et al. |
| 6,816,572 B2 | 11/2004 | Jabri et al. |
| 7,545,965 B2 * | 6/2009 | Suzuki et al. ................. 382/128 |
| 2003/0215119 A1 | 11/2003 | Uppaluri et al. |
| 2004/0101086 A1 | 5/2004 | Sabol et al. |

FOREIGN PATENT DOCUMENTS

EP 1 426 903 A2 6/2004

OTHER PUBLICATIONS

International Search Report, International Application No. PCT/US2008/001789, dated Jul. 7, 2008, pp. 2.
VanMetter et al., "Cardiac Gating for Dual-Energy Imaging," U.S. Appl. No. 11/951,483, filed Dec. 6, 2007.

* cited by examiner

*Primary Examiner* — Abolfazl Tabatabai

(57) ABSTRACT

A method is disclosed for generating a composite image from dual-energy projection radiographic image data and renormalizing the composite image such that the pixel values for the composite image have the same relationship to the detected x-ray energy as the original high- and low-energy images. The method disclosed further provides for renormalization of material specific decomposition images formed form dual energy projection radiographic image data such that the decomposition images are on a common scale with either the high-energy, low-energy or composite image.

25 Claims, 7 Drawing Sheets

RENORMALIZATION OF DUAL-ENERGY IMAGES

RELATED APPLICATIONS

This application claims the benefit of U.S. Provisional Application No. 60/889,356 filed Feb. 12, 2007.

FIELD OF THE INVENTION

The invention relates generally to the field of dual-energy projection radiography. In particular the invention relates to the method for creation of a set of images, including material specific decomposition images and a composite image formed from a weighted addition of the high- and low-energy images, which are renormalized such that they have a consistent pixel value representation. The renormalized representation of the set of images facilitates the application of consistent, robust display image processing.

BACKGROUND OF THE INVENTION

Digital projection-radiographic images are commonly represented as "for-processing" pixel values, which have a well-defined relationship to the detected x-ray energy and are proportional to the x-ray attenuation properties of the object being imaged. This relationship is an important factor when selecting the image processing needed to create the "for-display" image required for optimal viewing on a diagnostic workstation or other display modality.

In dual-energy imaging, two images of the same object are acquired under different x-ray beam conditions, such as beam energy and filtration. These images are proportional to the x-ray transmittance of the object for the differing x-ray spectra. These images can then be decomposed to produce material specific images, such as soft-tissue and bone images.

The most widely used method of decomposition processing is log-weighted subtraction. In log-weighted subtraction, the image data for the high- and low-energy images are transformed to be proportional to the natural logarithm of the x-ray energy detected. The low-energy log image is then multiplied by an appropriate weighting factor and subtracted from the high-energy log image to produce either the bone or soft tissue image depending on the value of the weighting factor.

The log-weighted subtraction process, however, alters the relationship between the resulting material specific decomposition image pixel values and the x-ray attenuation properties of the object, which can be problematic for display image processing algorithms designed for single-acquisition digital projection images in several ways. First, the range of pixel values in the material specific decomposition image may differ significantly between the different images and from the range of pixel values typically obtained with a traditional radiograph. Second, the scaling of pixel values with the attenuation of the object components may differ. Finally, the pixel values in the material specific decomposition images may be additively inverted. These problems all interfere with the ability of "for-display" image processing software to provide a visually compatible set of decomposition images. Therefore, there is a need to provide a method of renormalizing the different material specific decomposition images such that the images are on a common scale and that the pixel values in both images have the same relationship to the x-ray attenuation properties of the materials being imaged.

Further, radiologists are trained to view conventional radiographic images. Although the decomposition images formed from dual-energy imaging provide diagnostically important information, a radiologist may wish to view an image that more closely resembles a conventional radiographic image. Therefore, there is a need to provide a method of forming a visually optimized composite image from the dual-energy image data that can serve as a surrogate for a conventional radiographic image, which avoids the need to expose a patient to additional ionizing radiation. There is also a need to provide a method of renormalizing the composite image such that the composite image pixel values have the same relationship to the material x-ray attenuation properties as the material specific decomposition images in order to facilitate "for-display" image processing of the type used for the material decomposition images.

SUMMARY OF THE INVENTION

The present invention provides a method for creating a composite image from dual-energy image data. The composite image is constructed by taking a weighted sum of the high- and low-energy images and is a surrogate for a conventional radiographic image. The present invention further provides a method of renormalizing the composite image such that the composite image has an analogous relationship to the detected x-ray energy as the original high-energy, low-energy or material specific decomposition images. The composite image may be normalized by a factor $\{1+w_C\}$. As such, the pixel values of an exposure independent composite image may be calculated using the following equation:

$$PV_C^* = \frac{PV_H^* + w_C PV_L^*}{[1 + w_C]} = -\mu_{BC} t_B - \mu_{SC} t_S$$

wherein $\mu_{BC}$ represents a bone attenuation coefficient of the composite image, $\mu_{SC}$ represents a soft-tissue attenuation coefficient of the composite image, $t_B$ is the thickness of the bone, and $t_S$ is the thickness of the soft-tissue. The attenuation coefficients $\mu_{BC}$ and $\mu_{SC}$ are given by a weighted average of the bone and soft-tissue coefficients for the high- and low-energy images.

For image processing purposes, a value for the unattenuated exposure for the composite image may be added as an offset, such that the pixel values of an exposure dependent composite image are computed as:

$$PV_C^{\#} = \frac{PV_H^* + w_C PV_L^*}{[1 + w_C]} + \log(I_{C0}) = \log(I_{C0}) - \mu_{BC} t_B - \mu_{SC} t_S$$

The unattenuated exposure for the composite image may be determined using the following equation:

$$\log(I_{C0}) = \frac{[\log(I_{H0}) + w_C \log(I_{L0})]}{[1 + w_C]}$$

Alternatively, the unattenuated exposure for the composite image is given by the equation:

$$\log(I_{C0}) = \log(I_{H0} + I_{L0})$$

The present invention also provides a method for renormalizing material specific decomposition images, such as a bone image or a soft-tissue image, such that the decomposition images are on the same scale as either the high-energy image, the low-energy image or the composite image. In the preferred embodiment, the pixel values of an exposure independent soft-tissue image are on the same scale as the composite image and are calculated using the equation:

$$PV_S''' = \frac{[w_B + w_C]}{[w_B - w_S]} \frac{PV_H^* - w_S PV_L^*}{1 + w_C} = -\frac{\mu_{SH} + w_C \mu_{SL}}{[1 + w_C]} t_S = -\mu_{SC} t_S$$

Similarly, the pixel values of an exposure independent bone image, which are on the same scale as the composite image are calculated using the equation:

$$PV_B''' = \frac{[w_S + w_C]}{[w_S - w_B]} \frac{PV_H^* - w_B PV_L^*}{1 + w_C} = -\frac{\mu_{BH} + w_C \mu_{BL}}{[1 + w_C]} t_B = -\mu_{BC} t_B$$

For image processing purposes, a value for the unattenuated exposure for the composite image may be added as an offset, such that the pixel values of the exposure dependent soft-tissue and bone image are computed, respectively as:

$$PV_S^{\#} = \log(I_{C0}) + PV_S''' = \log(I_{C0}) - \mu_{SC} t_S$$

$$PV_B^{\#} = \log(I_{C0}) + PV_B''' = \log(I_{C0}) - \mu_{BC} t_B$$

The same alternate options for the value of $\log(I_{C0})$ described above for the composite image are applicable. The renormalization of both the composite and the decomposition images facilitates the use of display image processing software designed to process conventional radiographic images for display on a diagnostic workstation.

BRIEF DESCRIPTION OF THE DRAWINGS

The foregoing and other objects, features, and advantages of the invention will be apparent from the following more particular description of the embodiments of the invention.

DETAILED DESCRIPTION OF THE INVENTION

In the following description, bone and soft-tissue decomposition images are described to illustrate an embodiment of the present invention. The present invention may be applied to any two suitably chosen materials.

Figure 1:
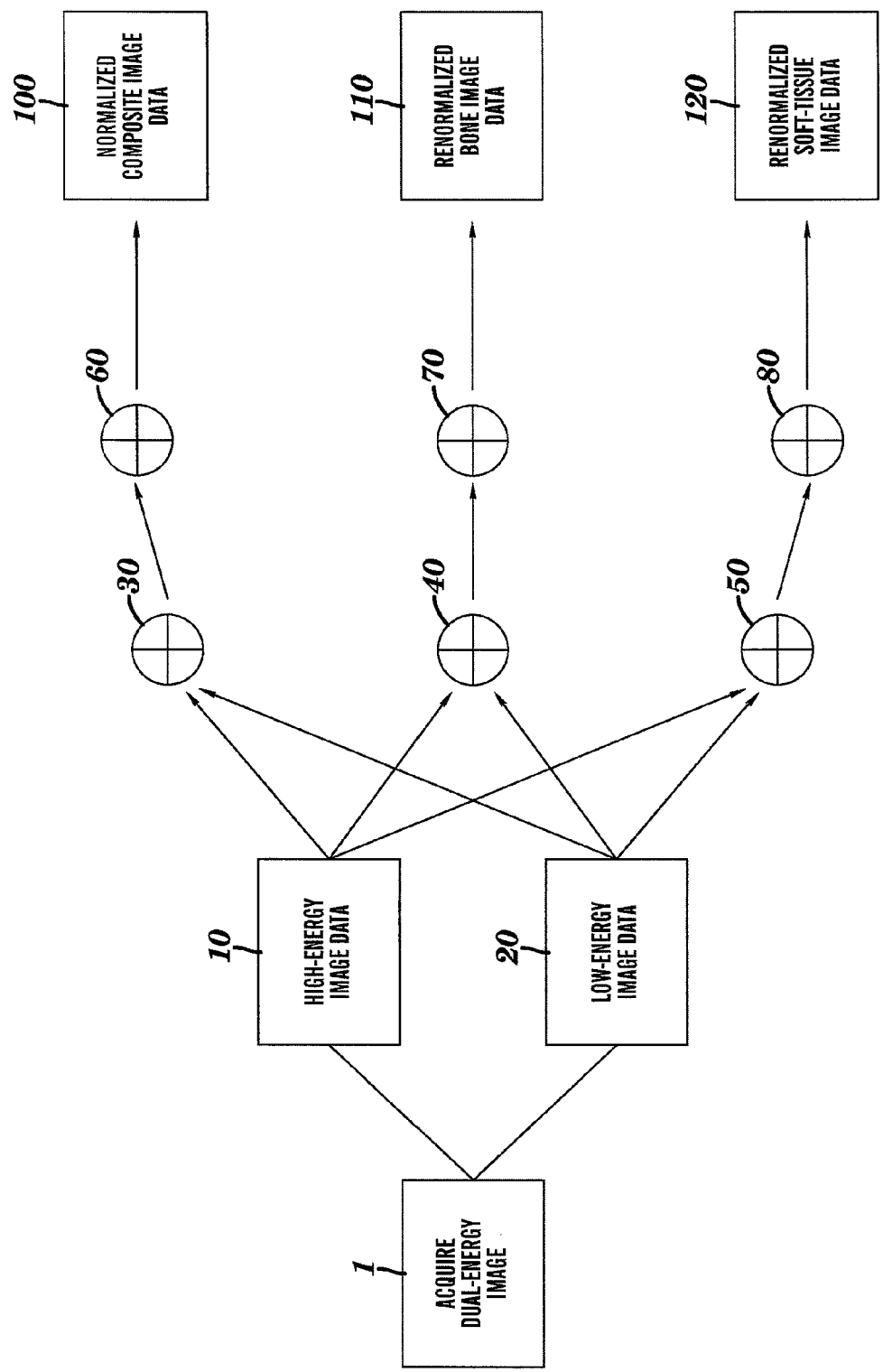
FIG. 1 shows a functional block diagram of the method for creating renormalized decomposition and composite images.

FIG. 1 is a functional block diagram of the method for creating renormalized images in accordance with an embodiment of the present invention. In step 1 dual-energy images are acquired. Blocks 10 and 20 represent the log-transformed image data for the high- and low-energy images, respectively.

Figure 2:
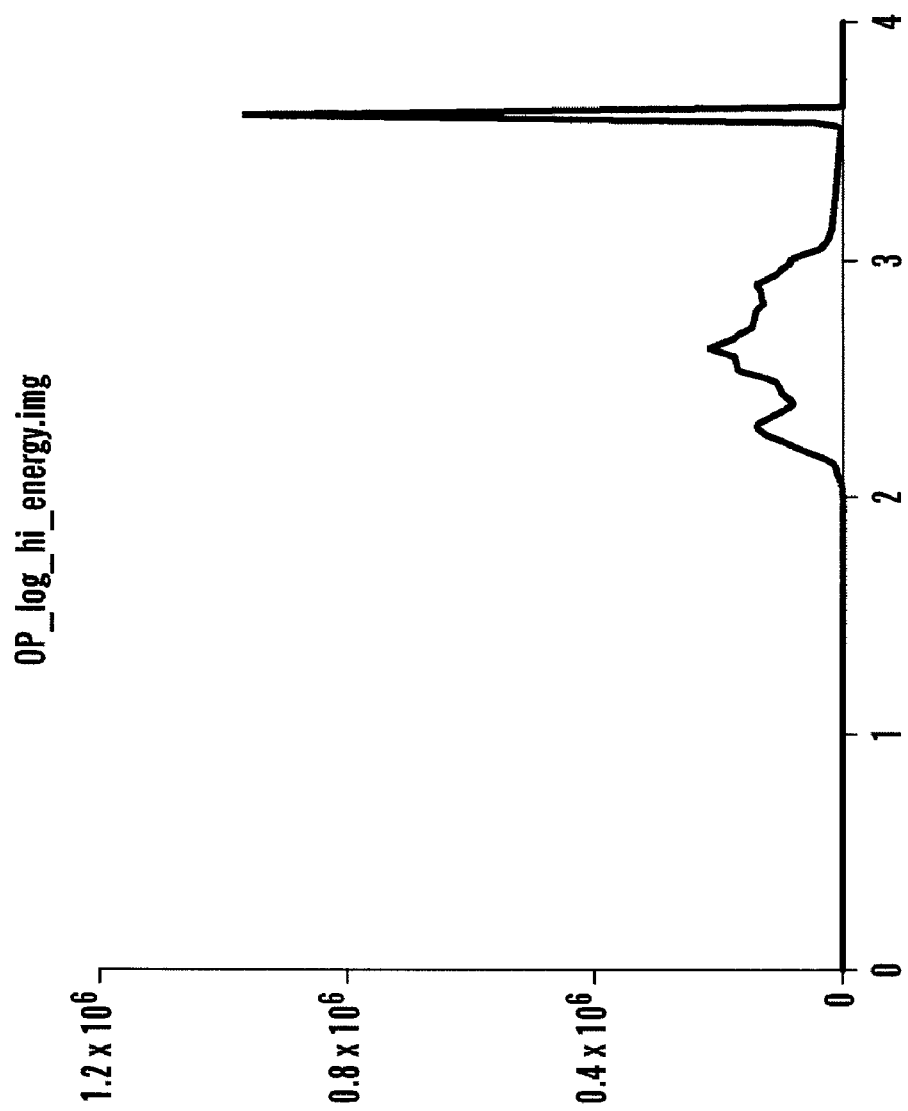
FIG. 2 shows a histogram of the logarithmic pixel values of a high-energy image acquired with a dual-energy protocol.
Figure 3:
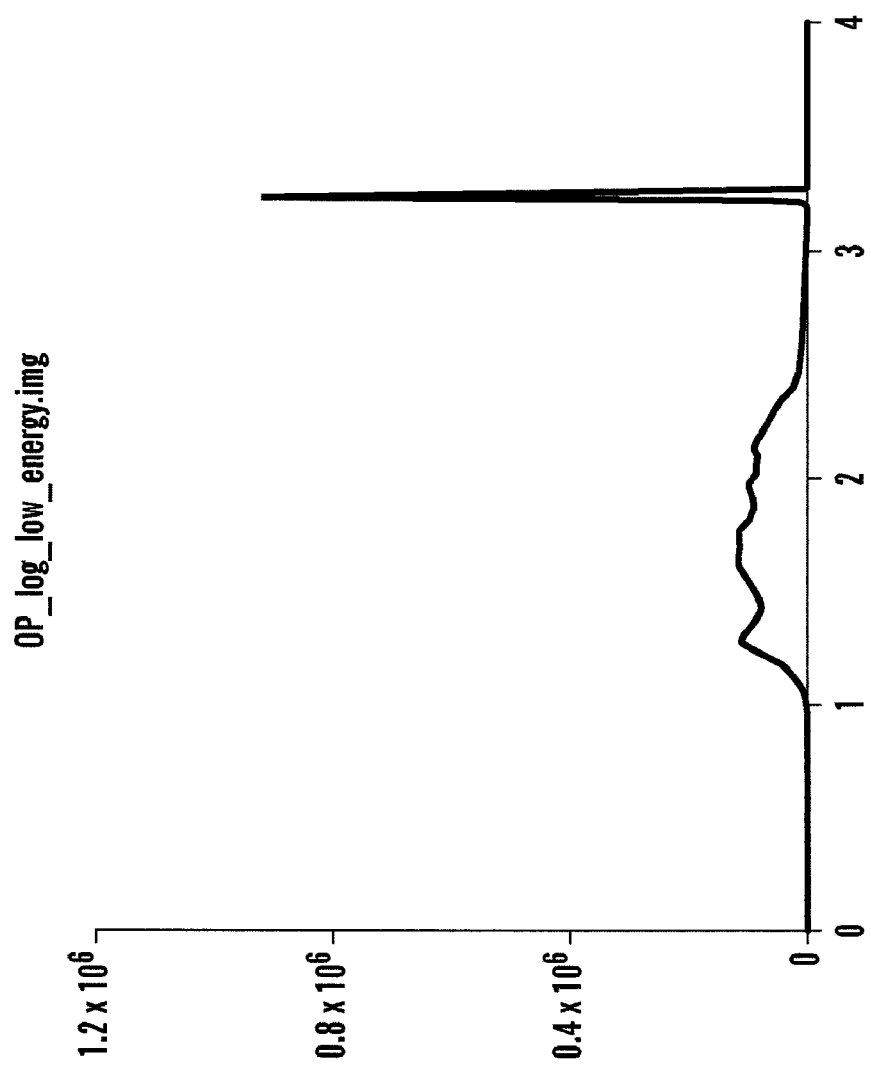
FIG. 3 shows a histogram of the logarithmic pixel values of a low-energy image acquired with a dual-energy protocol.

The pixel values for the log-transformed high- and low-energy images can be expressed as:

$$PV_H = \log(I_H) = \log(I_{H0}) - \mu_{BH} t_B - \mu_{SH} t_S \quad (1)$$

and $$PV_L = \log(I_L) = \log(I_{L0}) - \mu_{BL} t_B - \mu_{SL} t_S \quad (2)$$

where $PV_H$ and $PV_L$ represent the values stored in each pixel of the high- and low-energy images. $PV_H$ and $PV_L$ are proportional to the natural logarithm of the intensity of the high-energy x-ray detected ($I_H$) and the low-energy x-ray detected ($I_L$) after those values are corrected based on factors inherent to the detector, such as detector gain and offset corrections. The values $\log(I_{H0})$ and $\log(I_{L0})$ represent the pixel values that would be obtained without attenuation for the high- and low-energy images, respectively. In practice, the values of $I_{H0}$ and $I_{L0}$ can be determined from the exposure techniques using pre-calibrated technique factors or from histogram analysis of the original image data. Further, $\mu_{BH}$ and $\mu_{SH}$ represent the bone and soft-tissue attenuation coefficients of the incident high-energy x-ray beam, while $\mu_{BL}$ and $\mu_{SL}$ represent the bone and soft-tissue attenuation coefficients of the incident low-energy x-ray beam. Additionally, $t_B$ and $t_S$ represent the thickness of the bone and soft-tissue. FIGS. 2 and 3 show sample histograms of the logarithmic pixel values $PV_H$ and $PV_L$ of a high- and low-energy image, respectively.

The pixel values can be represented in a form that is independent of the exposure.

$$PV_H^* = \log(I_H) - \log(I_{H0}) = -\mu_{BH} t_B - \mu_{SH} t_S \quad (3)$$

$$PV_L^* = \log(I_L) - \log(I_{L0}) = -\mu_{BL} t_B - \mu_{SL} t_S \quad (4)$$

where $PV_H^*$ and $PV_L^*$ represent the exposure independent pixel values for the high- and low-energy images. This exposure independent representation of the original image data facilitates computation of the decomposition images that avoids histogram shifts normally associated with log-weighted subtraction methods. From these equations, it can be recognized that $PV_H^*$ and $PV_L^*$ depend only on the physical x-ray attenuation properties of the bone and soft-tissue at the two different beam energies and the thickness of the relevant materials. The sensitivity differences of the detector at the two different energies and the effects of differing exposure levels for the high- and low-energy acquisitions have been removed. This exposure independent representation of the original high- and low-energy images facilitates renormalization scaling factors that maintain consistent pixel value representations across the composite, soft-tissue and bone images.

Referring again to FIG. 1, in step 30 a composite image is formed by taking the weighted sum of the high- and low-energy log-images.

$$PV_C = PV_H + w_C PV_L = [\log(I_{H0}) + w_C \log(I_{L0})] - (\mu_{BH} + w_C \mu_{BL}) t_B - (\mu_{SH} + w_C \mu_{SL}) t_S \quad (5)$$

where $PV_C$ represents the pixel value for the composite image and $w_C$ represents the weighting factor of the low-energy image. The value for $w_C$ may be determined theoretically or by empirical means. The composite image acts as a surrogate for a conventional radiographic image. Further, the composite image combines the image information from the high- and low-energy image pair in such a way that the optimal amount of available image data is utilized. This provides a higher quality image than either the high- or low-energy image alone.

In step 60 the pixel values for the composite image are renormalized. A physically meaningful normalization recognizes that the appropriate attenuation coefficients of the materials in a composite image lie between the high- and low-energy values. Normalizing by $\{1+w_C\}$ accomplishes the normalization for a weighted average attenuation.

$$PV_C = \frac{PV_H + w_C PV_L}{[1 + w_C]} \quad (6)$$

$$= \frac{[\log(I_{H0}) + w_C \log(I_{L0})]}{[1 + w_C]} - \frac{(\mu_{BH} + w_C \mu_{BL})}{[1 + w_C]} t_B - \frac{(\mu_{SH} + w_C \mu_{SL})}{[1 + w_C]} t_S$$

The exposure independent representation is provided as:

$$PV_C^* = \frac{PV_H^* + w_C PV_L^*}{[1 + w_C]} \quad (7)$$

$$= -\frac{(\mu_{BH} + w_C \mu_{BL})}{[1 + w_C]} t_B - \frac{(\mu_{SH} + w_C \mu_{SL})}{[1 + w_C]} t_S$$

Defining the effective bone and soft-tissue attenuation coefficients $\mu_{BC}$ and $\mu_{SC}$ in the composite image as the weighted averages of the bone and soft-tissue attenuation coefficients in the high- and low-energy images as follows:

$$\mu_{BC} = \frac{(\mu_{BH} + w_C \mu_{BL})}{[1 + w_C]} \quad (8)$$

$$\mu_{SC} = \frac{(\mu_{SH} + w_C \mu_{SL})}{[1 + w_C]} \quad (9)$$

allows equation (7) to be rewritten as:

$$PV_C^* = \frac{PV_H^* + w_C PV_L^*}{[1 + w_C]} = -\mu_{BC} t_B - \mu_{SC} t_S \quad (10)$$

It can be seen that this equation is analogous in form to the exposure independent equations for $PV_H^*$ and $PV_L^*$ in that $PV_C^*$ depends only on the effective attenuation coefficients of the bone and soft-tissue materials for the composite image, $\mu_{BC}$ and $\mu_{SC}$ and the thickness of the relevant materials.

The goal of the preferred embodiment is to determine the appropriate renormalization for the soft-tissue and bone images that recast their pixel values into the same space as $PV_C^*$, as represented in equation (10). This will ensure a consistent interpretation for the pixel values in all three images and allow a consistent and robust application of "for-display" image processing to all three images.

Referring again to FIG. 1, in steps 40 and 50 log weighted subtraction is applied to obtain both a soft-tissue image and a bone image. For example, the log weighted subtraction of the pixel values for the high- and low-energy images necessary to obtain a soft-tissue image is given by the following equation:

$$\log(I_H) - w_S \log(I_L) = [\log(I_{H0}) - w_S \log(I_{L0})] - (\mu_{BH} - w_S \mu_{BL}) t_B - (\mu_{SH} - w_S \mu_{SL}) t_S \quad (11)$$

where $w_S$ is weighting factor for the soft-tissue image. The value for $w_S$ may be determined theoretically or by empirical means.

In order to obtain the soft-tissue image, the image of the bones is cancelled by selecting $w_S$ such that $\mu_{BH} - w_S \mu_{BL} = 0$, giving $w_S = \mu_{BH}/\mu_{BL}$. Equation (11) becomes:

$$PV_S = \log(I_H) - \frac{\mu_{BH}}{\mu_{BL}} \log(I_L) \quad (12)$$

$$= \left[\log(I_{H0}) - \frac{\mu_{BH}}{\mu_{BL}}(I_{L0})\right] - \left(\mu_{SH} - \frac{\mu_{BH}}{\mu_{BL}} \mu_{SL}\right) t_S$$

which now represents the pixel values of the soft-tissue (bone subtracted) image. A feature of these pixel values in this image is that neither the unattenuated pixel values nor the attenuation coefficients have a physically interpretable value. The values will depend on the value of $w_S$ needed to cancel the bone image. Hence the pixel values of the "for-processing" image do not have a clear interpretation and are not on the same scale as the composite image, the high-energy or the low-energy image. This can create a problem for display processing because the display processing algorithm assumes that the pixel values bear a fixed relationship to the logarithm of the x-ray energy detected, and are constrained to a well-defined range of values. For example, display processing may use pixel values to make inferences about the expected noise in the image data. Arbitrary offset and scaling of pixel values, such as in the representation of $PV_S$ above, can cause unstable behavior of such noise estimation algorithms.

Both the scaling and the offset of the data are problematic, but scaling is the more serious problem. The offset problem is easily avoided by adopting the exposure independent representation of the original high- and low-energy images. The attenuation-scaling problem can be avoided by renormalizing the pixel values to match the attenuation of the high-energy image, the low-energy image or the composite image.

In steps 70 and 80 the pixel values for both the soft-tissue and bone images are renormalized to represent either the attenuation of the high-energy image, the low-energy image or the composite image. For example, the pixel values for the soft-tissue image can be renormalized to represent the attenuation of the high energy image as follows. The exposure independent representation of the pixel values for the soft-tissue image can be written as follows:

$$PV_S^* = PV_H^* - w_S PV_L^* = -\mu_{SH}\left(1 - \frac{\mu_{BH}}{\mu_{BL}} \frac{\mu_{SL}}{\mu_{SH}}\right) t_S \quad \text{or} \quad (13)$$

$$PV_S^* = -\mu_{SH}\left(1 - \frac{w_S}{w_B}\right) t_S \quad (14)$$

where $w_B$ is selected to cancel the soft-tissue image components, such that $\mu_{SH} - w_B \mu_{SL} = 0$. Renormalizing equation (14) with the appropriate factor (in this case $1 - w_S/w_B$), creates pixel values with a well-defined attenuation scale based solely on the known values of the attenuation coefficient of the soft-tissue for the high-energy image $\mu_{SH}$) and the thickness of the soft-tissue ($t_S$):

$$PV_S' = \frac{PV_H^* - w_S PV_L^*}{\left[1 - \frac{w_S}{w_B}\right]} = -\mu_{SH} t_S \quad (15)$$

Likewise, the pixel values for the soft-tissue image can be renormalized to represent the attenuation of the low-energy image as follows.

$$PV_S^* = PV_H^* - w_S PV_L^* = -\mu_{SL}\left(\frac{\mu_{SH}}{\mu_{SL}} - \frac{\mu_{BH}}{\mu_{BL}}\right)t_S \quad (16)$$

or $$PV_S^* = PV_H^* - w_S PV_L^* = -\mu_{SL}(w_B - w_S)t_S \quad (17)$$

Renormalizing equation (17) with the appropriate factor (in this case $w_B - w_S$), creates pixel values with a well-defined attenuation scale based solely on the known values of the attenuation coefficient of the soft-tissue for the high-energy image ($\mu_{SL}$) and the thickness of the soft-tissue ($t_S$).

$$PV_S'' = \frac{PV_H^* - w_S PV_L^*}{[w_B - w_S]} = -\mu_{SL}t_S \quad (18)$$

In the preferred embodiment, the attenuation factor scale is that of the composite image.

$$\mu_{SC} = \frac{(\mu_{SH} + w_C \mu_{SL})}{[1 + w_C]} \quad (19)$$

Linear combination of the equations (15) and (18) provides:

$$PV_S''' = \frac{[w_B + w_C]}{[\mu_{SH} + w_C]\mu_{SL}]} \frac{PV_H^* - w_S PV_L^*}{[1 + w_C]} t_S + w_C$$

$$= -\mu_{SC}t_S \quad (20)$$

which can be used as a working equation for a fully normalized soft-tissue image, with the soft-tissue image expressed on the same attenuation scale as the exposure independent composite image.

In a similar fashion, it can be shown that for the bone image:

$$PV_B''' = \frac{[w_S + w_C]}{[w_S - w_B]} \frac{PV_H^* - w_B PV_L^*}{1 + w_C}$$

$$= -\frac{\mu_{BH} + w_C \mu_{BL}}{[1 + w_C]} t_B \quad (21)$$

$$= -\mu_{BC}t_B$$

which can be used as a working equation for fully normalized bone image, with the bone image expressed on the same attenuation scale as the exposure independent composite image.

For image processing, the pixel values, $PV_C^*$, $PV_S^*$ and $PV_B^*$ can be represented in exposure dependent forms as follows:

$$PV_C^\# = \frac{PV_H^* + w_C PV_L^*}{[1 + w_C]} + \log(I_{C0}) \quad (22)$$

$$= \log(I_{C0}) - \mu_{BC}t_B - \mu_{SC}t_S$$

$$PV_S^\# = \log(I_{C0}) + PV_S''' = \log(I_{C0}) - \mu_{SC}t_S \quad (23)$$

$$PV_B^\# = \log(I_{C0}) + PV_B''' = \log(I_{C0}) - \mu_{BC}t_B \quad (24)$$

where $I_{C0}$ is the effective unattenuated exposure for the composite image. As previously stated, $\log(I_{H0})$ and $\log(I_{L0})$ can be estimated from either the unattenuated areas of the high- and low-energy images or from known technique factors. As such, an appropriate shift can be applied to place the unattenuated x-ray fluence of the composite, soft-tissue and bone images at $\log(I_{C0})$ by adding the following offset:

$$\log(I_{C0}) = \frac{[\log(I_{H0}) + w_C \log(I_{L0})]}{[1 + w_C]} \quad (25)$$

An alternative useful choice for the placement of the standard exposure for the composite, soft-tissue and bone images is provided in the following equation:

$$\log(I_{C0}) = \log(I_{H0} + I_{L0}) \quad (26)$$

Blocks 100, 110, and 120 represent the renormalized image data for the composite image, the soft-tissue image and the bone image. As a result of the renormalization, the pixel values for these three images are on the same scale as the original high- and low-energy images. The attenuation coefficients for the soft-tissue and bone for the composite image reflect a weighted average of the attenuation coefficients for those materials for the high- and low-energy x-ray beams.

Figure 4:
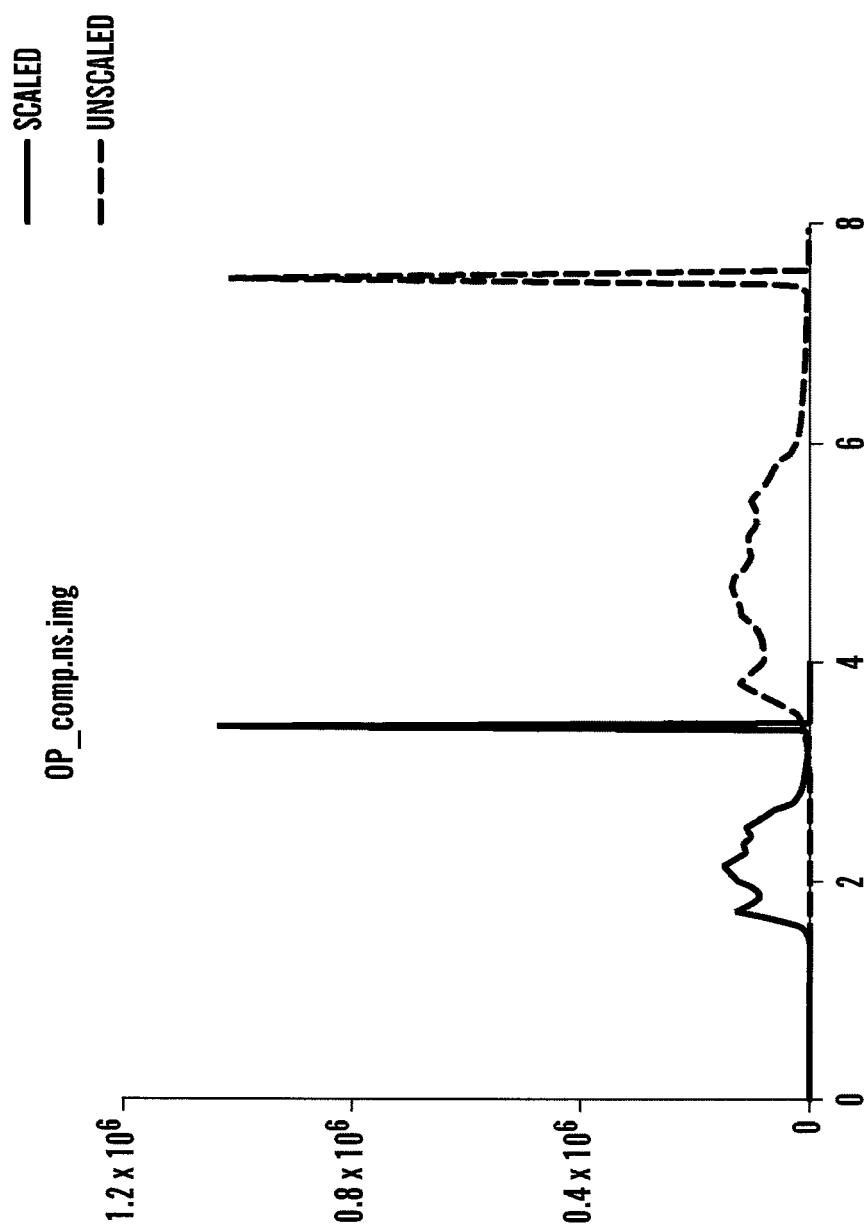
FIG. 4 shows a histogram of the logarithmic pixel values of a composite image without renormalization (unscaled) and with renormalization (scaled).

FIG. 4 depicts a histogram of the logarithmic pixel values of the composite image without renormalization (unscaled) and with renormalization (scaled). If the composite image is unscaled, the addition of the high- and low-energy image pixel values results in a range that is expected to be the sum of the component images. This is outside of the range of pixel values that the display image processing accepts. The range of values in the histogram is also expanded. The renormalization results in a composite image having a histogram in which the unattenuated x-ray peak is in the expected range.

Figure 5:
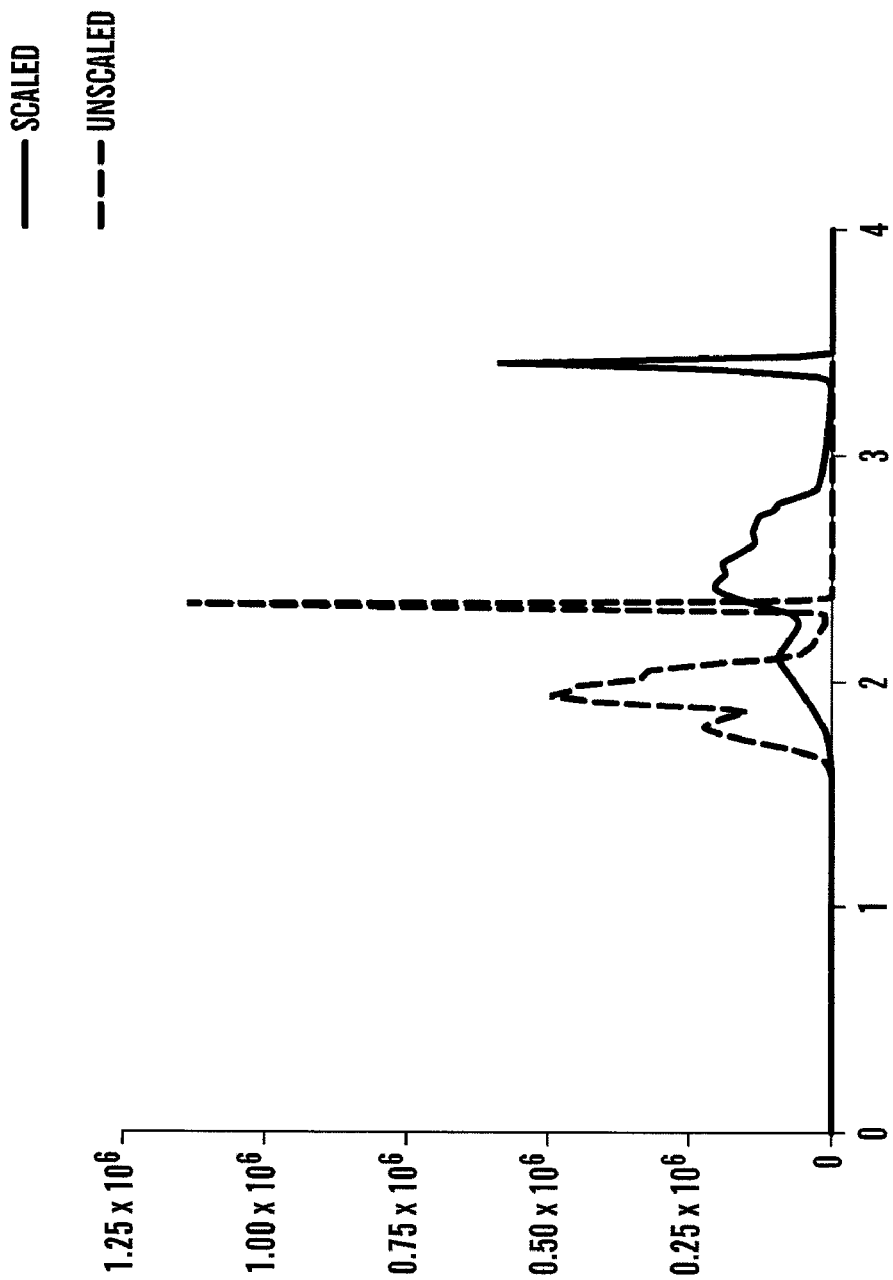
FIG. 5 shows a histogram of the logarithmic pixel values of a soft-tissue image without renormalization (unscaled) and with renormalization (scaled).
Figure 6:
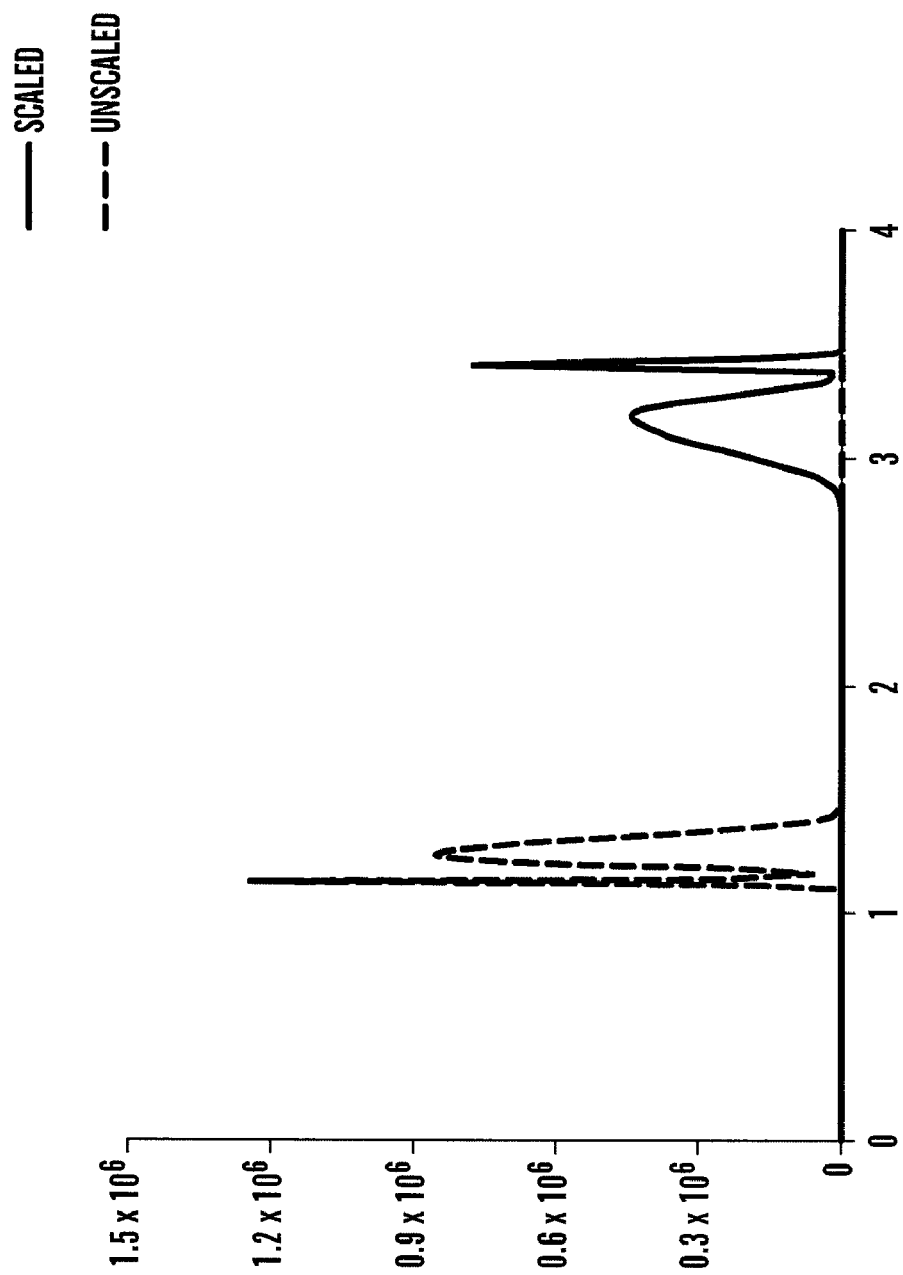
FIG. 6 shows a histogram of the logarithmic pixel values of a bone image without renormalization (unscaled) and with renormalization (scaled)
Figure 7:
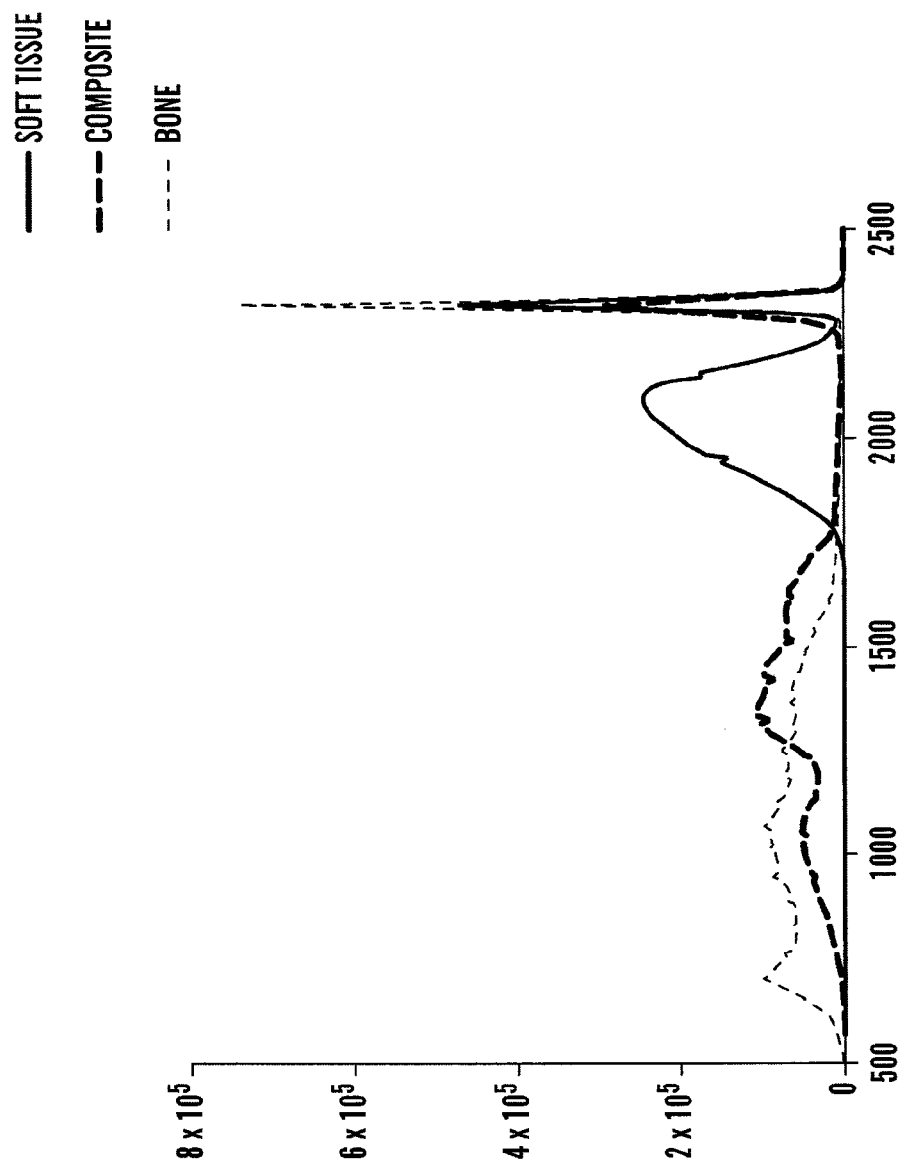
FIG. 7 shows the histograms of the for-processing pixel values of the composite, bone and soft-tissue images with renormalization.

FIGS. 5 and 6 show histograms of the logarithmic pixel values of a soft-tissue and bone images without renormalization (unscaled) and with renormalization (scaled). Without renormalization, the images that result from dual-energy decomposition no longer represent x-ray exposure and the attenuation of anatomical areas on the same scale expected by image processing algorithms. This can result in less than optimum rendering of the "for-display" decomposition images. Renormalization can be used to preserve the relationship between the two decomposition images and a composite image. This is useful for quantitative assessment of the image data. FIG. 7 shows the histograms of the for-processing pixel values of the composite, bone and soft-tissue images with renormalization. The pixel values of the three images are on a common scale, which facilitates consistent, robust image processing of the image data.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A computer-implemented method of producing a composite image from dual energy image data comprising:
   calculating a weighted sum of image data for a high-energy radiographic image and a low-energy radiographic image, wherein the image data for the low-energy radiographic image is weighted by a weighting factor.

2. The method of claim 1 wherein the weighting factor is a weighting factor, $w_c$.

3. The method of claim 2 wherein composite image data is renormalized such that the composite image data has a same relationship to detected x-ray energy as the high- and low-energy radiographic images.

4. A method of producing a composite image from dual energy image data comprising:
   calculating a weighted sum of image data for a high-energy radiographic image and a low-energy radiographic image,
   wherein the sum is weighted by a weighting factor, $w_c$, and wherein the composite image is normalized by a factor $\{1+w_c\}$ such that composite image data has a same relationship to detected x-ray energy as the high- and low-energy radiographic images.

5. The method of claim 4 wherein pixel values of an exposure independent composite image are computed as:

$$PV_C^* = \frac{PV_H^* + w_C PV_L^*}{[1+w_C]} = -\mu_{BC} t_B - \mu_{SC} t_S$$

wherein $\mu_{BC}$ represents a bone attenuation coefficient of the composite image, $\mu_{SC}$ represents a soft-tissue attenuation coefficient of the composite image, $t_B$ is a thickness of bone, and $t_S$ is a thickness of soft-tissue.

6. The method of claim 5 wherein the attenuation coefficients $\mu_{BC}$ and $\mu_{SC}$ are given by a weighted average of the bone and soft-tissue coefficients for the high- and low-energy radiographic images.

7. The method of claim 5 wherein a value for an unattenuated exposure for the composite image is added as an offset.

8. The method of claim 7 wherein pixel values of an exposure dependent composite image are computed as:

$$PV_C^\# = \frac{PV_H^* + w_C PV_L^*}{[1+w_C]} + \log(I_{C0}) = \log(I_{C0}) - \mu_{BC} t_B - \mu_{SC} t_S$$

9. The method of claim 8 wherein the unattenuated exposure for the composite image is given by the equation:

$$\log(I_{C0}) = \frac{[\log(I_{H0}) + w_C \log(I_{L0})]}{[1+w_C]}.$$

10. The method of claim 8 wherein the unattenuated exposure for the composite image is given by the equation:

$$\log(I_{C0}) = \log(I_{H0} + I_{L0}).$$

11. A computer-implemented method for renormalizing dual-energy decomposition images comprising:
    renormalizing the decomposition images such that a relationship between pixel values of at least one of the decomposition image to an original detected x-ray energy is well-defined.

12. The method of claim 11 wherein the decomposition images consist of a bone image and a soft tissue image.

13. The method of claim 11 wherein the relationship between the pixel values of the decomposition images to the original detected x-ray energy is the same as in an original high-energy image.

14. The method of claim 11 wherein the relationship between the pixel values of the decomposition images to the original detected x-ray energy is the same as in an original low-energy image.

15. The method of claim 11 wherein the relationship between the pixel values of the decomposition image to the original detected x-ray energy is the same as in a composite image formed from high- and low-energy images.

16. The method of claim 15 wherein pixel values of an exposure independent soft-tissue image are computed as:

$$PV_S'' = \frac{[w_B + w_C]}{[w_B - w_S]} \frac{PV_H^* - w_S PV_L^*}{1 + w_C} = -\frac{\mu_{SH} + w_C \mu_{SL}}{[1+w_C]} t_S = -\mu_{SC} t_S.$$

17. The method of claim 16 wherein a value for an unattenuated exposure for the composite image is added as an offset.

18. The method of claim 17 wherein pixel values of an exposure dependent composite image are computed as:

$$PV_S^\# = \log(I_{C0}) + PV_S''' = \log(I_{C0}) - \mu_{SC} t_S.$$

19. The method of claim 18 wherein the unattenuated exposure for the composite image is given by the equation:

$$\log(I_{C0}) = \frac{[\log(I_{H0}) + w_C \log(I_{L0})]}{[1+w_C]}.$$

20. The method of claim 18 wherein the unattenuated exposure for the composite image is given by the equation:

$$\log(I_{C0}) = \log(I_{H0} + I_{L0}).$$

21. The method of claim 15 wherein pixel values of an exposure independent bone image are computed as:

$$PV_B''' = \frac{[w_S + w_C]}{[w_S - w_B]} \frac{PV_H^* - w_B PV_L^*}{1 + w_C} = -\frac{\mu_{BH} + w_C \mu_{BL}}{[1+w_C]} t_B = -\mu_{BC} t_B.$$

22. The method of claim 21 wherein a value for an unattenuated exposure for the composite image is added as an offset.

23. The method of claim 22 wherein pixel values of an exposure dependent bone image are computed as:

$$PV_B^\# = \log(I_{C0}) + PV_B''' = \log(I_{C0}) - \mu_{BC} t_B.$$

24. The method of claim 23 wherein the unattenuated exposure for the compose image is given by the equation:

$$\log(I_{C0}) = \frac{[\log(I_{H0}) + w_C \log(I_{L0})]}{[1+w_C]}.$$

25. The method of claim 23 wherein the unattenuated exposure for the composite image is given by the equation:

$$\log(I_{C0}) = \log(I_{H0} + I_{L0}).$$

* * * * *